United States Patent [19]

Davis

[11] Patent Number: 4,644,652
[45] Date of Patent: Feb. 24, 1987

[54] LOPPER WITH BYPASSING BLADES

[75] Inventor: Richard E. Davis, West Hollywood, Calif.

[73] Assignee: S.M.S. Industries, Inc., Glendale, Calif.

[21] Appl. No.: 780,013

[22] Filed: Sep. 25, 1985

[51] Int. Cl.⁴ .................................... B26B 13/06
[52] U.S. Cl. ............................... 30/252; 30/341
[58] Field of Search ............ 30/254, 252, 259, 248, 30/341, 253

[56] References Cited

U.S. PATENT DOCUMENTS

| 2,406,670 | 8/1946 | Delgado | 30/252 |
| 2,557,506 | 6/1951 | Kovacevich | 30/259 |
| 2,745,178 | 5/1956 | Rogoff | 30/252 X |
| 3,055,107 | 9/1962 | Carlberg | 30/341 X |
| 3,146,527 | 9/1964 | Spurgeon | 30/254 |
| 3,187,430 | 6/1965 | Wallace et al. | 30/252 |
| 3,277,573 | 10/1966 | Nicoletta | 30/254 |
| 3,372,478 | 3/1968 | Wallace | 30/252 |
| 3,461,555 | 8/1969 | Bliznak | 30/254 |
| 4,050,152 | 9/1977 | Olson | 30/252 |

Primary Examiner—Jimmy C. Peters
Attorney, Agent, or Firm—Thompson, Birch, Gauthier & Samuels

[57] ABSTRACT

A lopper has first and second pivotably interconnected blades arranged on opposite sides of a cutting plane. The blades have arcuate cutting edges defining a crescent shaped opening which maintains the same configuration as it gradually diminishes in size before eventually disappearing as the cutting edges bypass each other during a cutting operation. Preferably, one of the blade tips extends angularly away from the cutting plane.

3 Claims, 6 Drawing Figures

U.S. Patent  Feb. 24, 1987  4,644,652
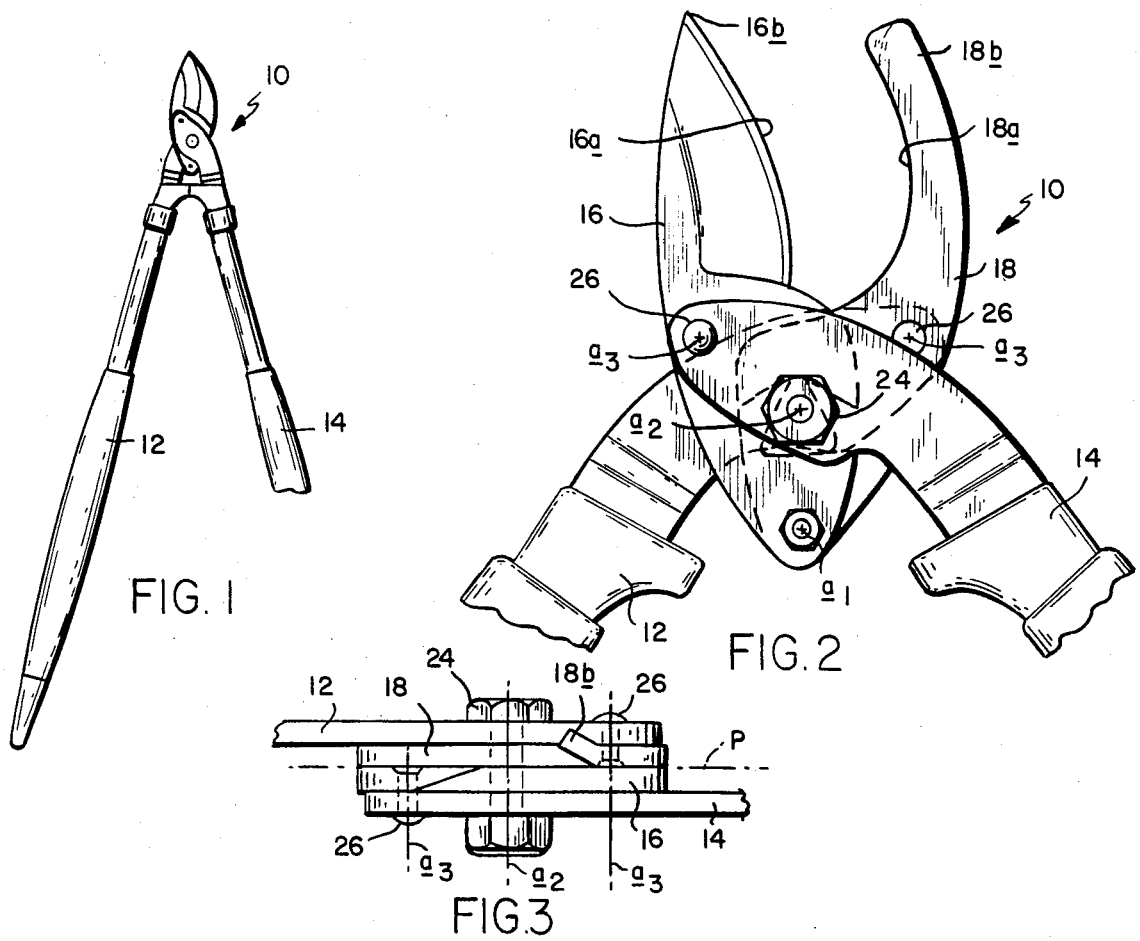
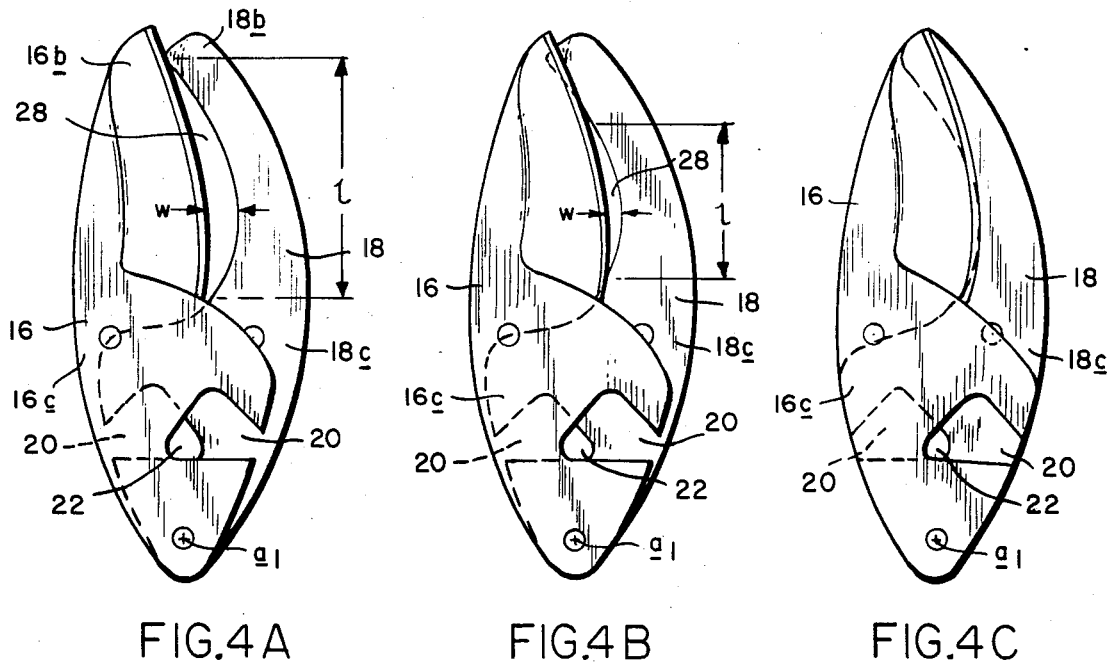
FIG.4A  FIG.4B  FIG.4C

LOPPER WITH BYPASSING BLADES

BACKGROUND OF THE INVENTION

This invention relates generally to pruning tools with bypassing blades of the type commonly referred to as "loppers", and is concerned in particular with a novel blade design which improves the cutting efficiency of such tools.

The cutting edges of pruning tools with bypassing blades conventionally provide one of several known cutting actions. For example, as shown in FIG. 7 of U.S. Pat. No. 2,523,610, the specially shaped cutting edges of some tools coact during a cutting operation to urge the workpiece towards the pivot axis of the blades. In other tools, as shown for example in U.S. Pat. Nos. 3,065,028; 2,942,341; 2,074,239 and 340,230, the coacting cutting edges act in a less advantageous manner to urge the workpiece away from the pivot axis of the blades.

In still other tools, such as for example the type shown in FIGS. 1 and 2 of U.S. Pat. No. 2,523,610, the coacting cutting edges appear to simultaneously bypass each other along substantially their entire lengths.

SUMMARY OF THE INVENTION

In accordance with the present invention, a lopper is provided with first and second pivotally interconnected blades arranged on opposite sides of a cutting plane. The blades have arcuate cutting edges configured to define a crescent shaped opening which gradually diminishes in size and eventually disappears as the cutting edges bypass each other during a cutting operation. The gradually decreasing crescent shaped opening centrally locates the workpiece and promotes a smoother and more uniform cutting action which progresses inwardly from opposite sides of the piece being cut.

Preferably, the tip portion of one blade extends angularly away from the cutting plane, thereby avoiding contact with the tip portion of the other blade as the blades undergo torsional stresses during a cutting operation.

BRIEF DESCRIPTION OF THE DRAWINGS

FIG. 1 is a view in side elevation with one of the handles broken away, of a lopper in accordance with the present invention;

FIG. 2 is a an enlarged side elevation of the lopper head, with the blades fully open;

FIG. 3 is a top plan view of the lopper head with the blades in the fully open position; and FIGS. 4A–4C are side elevational views of the blades showing their relative positions as they are progressively closed during a cutting operation.

DETAILED DESCRIPTION OF DISCLOSED EMBODIMENT

A lopper in accordance with the present invention is depicted in FIG. 1 as having a head portion 10 and a pair of handles 12, 14. With reference to FIGS. 2 and 3, it will be seen that the head portion 10 consists of first and second blades 16, 18 having their base portions interconnected for pivotal movement about a first axis $a_1$. The cutting blades 16, 18 are arranged on opposite sides of a cutting plane P, and are respectively provided with arcuate cutting edges 16a, 18a arranged to bypass each other on opposite sides of the cutting plane P. Cutting edge 16a is sharpened and has a radius of curvature which is greater than the radius of curvature of cutting edge 18a, the latter being blunt.

The base portions of the blades are notched as at 20 (see FIGS. 4A–4C) to define an enlarged opening 22.

The handles 12, 14 are interconnected for pivotal movement about a second axis $a_2$ by means of a bolt 24 extending through the opening 22 defined by the notches 20. Pins 26 respectively connect the handles 12, 14 to the blades 18, 16 for pivotal movement about third axes $a_3$. The pivot axes $a_1$, $a_2$ and $a_3$ are parallel to each other and perpendicular to the cutting plane P.

When the blades are fully open as illustrated in FIG. 3, their tip portions 16b, 18b are spaced apart and the cutting edges 16a, 18a defined an open notch for receiving a workpiece. FIGS. 4A—4B depict the relative blade positions as they are progressively closed during a cutting operation.

At the stage illustrated in FIG. 4A, only the base portions 16c, 18c and tips 16b, 18b have bypassed each other on opposite sides of the cutting plane P. The cutting blade segments which extend between these bypassed locations define a crescent shaped opening 28. At this stage, the opening 28 has a maximum length "l" and width "w".

With reference to FIG. 4B, it will be seen that as the blades continue to be closed, the crescent shaped opening 28 will diminish in size as evidenced by the decreased length l and width w. The locations at which the cutting edges bypass each other move steadily towards each other, thereby providing a cutting action which progresses inwardly towards the center of the opening 28 from opposite directions, tending to centrally locate the workpiece.

When the blades are fully closed as depicted in FIG. 4C, the cutting edges 16a, 18a have completely bypassed each other, and the crescent shaped opening 28 has completely disappeared.

Preferably, as shown in FIG. 3, one of the blade tips 18b extends angularly away from the cutting plane P. This insures that as the blades undergo torsional stresses during a particularly severe cutting operation, the angled tip 18b will avoid a damaging encounter with the other blade tip 16b.

I claim:

1. A lopper comprising: first and second blades arranged on opposite sides of a cutting plane, each of said blades having an arcuate cutting edge leading from a base portion of the blade to the blade tip; means for inter-connecting the base portions of said blades for pivotal movement about an axis perpendicular to said plane; and handle means connected to said base portions, said handle means being arranged to pivot said blades about said axis between an open position at which said blade tips are spaced apart and said cutting edges define an open notch, and a closed position at which said blade tips and said cutting edges completely bypass each other, the curvatures of said cutting edges being such that when the base portions and the tips of said blades initially overlap at two mutually spaced locations, the cutting edge segments extending between said locations define a crescent-shaped opening, and as said blades are pivoted to the closed position, said opening maintains the same configuration as it gradually diminishes in size before eventually disappearing, with said locations moving towards each other to centrally locate a workpiece in said opening.

2. The lopper of claim 1 wherein the tip of one of said blades extends angularly away from said cutting plane.

3. The lopper of claim 1 wherein said handle means comprises first and second handles interconnected for pivotal movement about a second axis which is parallel to said first-mentioned axis, said first and second handles being connected respectively to the base portions said first and second blades for pivotal movement about third axes parallel to said first mentioned axis and said second axis.

* * * * *